United States Patent [19]

Ligacz et al.

[11] Patent Number: 4,802,285
[45] Date of Patent: Feb. 7, 1989

[54] METHOD AND APPARATUS FOR ASCERTAINING THE RADIAL LOCATION OF A NEW WHEEL PROFILE TO BE PRODUCED BY A REPROFILING OPERATION

[75] Inventors: Herbert Ligacz, Erkelenz; Alfred Heimann, Aachen; Hartwig Klosterhalfen, Duren; Helmut Wittkopp, Erkelenz, all of Fed. Rep. of Germany

[73] Assignee: Wilhelm Hegenscheidt GmbH, Erkelenz, Fed. Rep. of Germany

[21] Appl. No.: 63,245

[22] Filed: Jun. 15, 1987

[30] Foreign Application Priority Data

Jun. 28, 1986 [EP] European Pat. Off. ........ 86108841.7

[51] Int. Cl.$^4$ ............................ G01B 5/20; G01B 7/28
[52] U.S. Cl. ..................................... 33/551; 33/203.11
[58] Field of Search .................................... 33/551–554, 33/203, 203.11, 503, 504, 1 M

[56] References Cited

U.S. PATENT DOCUMENTS

| | | | |
|---|---|---|---|
| 1,510,819 | 10/1924 | Barth | 33/203.11 X |
| 3,749,501 | 7/1973 | Wieg | 33/1 M |
| 4,268,968 | 5/1981 | Przybylinski | 33/203.11 X |
| 4,384,407 | 5/1983 | Miyamoto | 33/1 M X |
| 4,483,079 | 11/1984 | Band | 33/1 M X |

FOREIGN PATENT DOCUMENTS

| | | |
|---|---|---|
| 1142184 | 7/1963 | Fed. Rep. of Germany . |
| 1427003 | 10/1969 | Fed. Rep. of Germany . |
| 1293810 | 12/1969 | Fed. Rep. of Germany . |
| 1552335 | 5/1971 | Fed. Rep. of Germany . |
| 2924573 | 5/1982 | Fed. Rep. of Germany . |
| 2513389 | 11/1982 | Fed. Rep. of Germany . |
| 2537086 | 1/1985 | Fed. Rep. of Germany . |
| 1295442 | 5/1962 | France . |
| 0120804 | 7/1984 | Japan ...................... 33/551 |

OTHER PUBLICATIONS

Association of American Railroads, Manual of Standards and Recommended Practices, Section G—Part II, (21 pages total), published by the Association of American Railroads, Washington, D.C. 20036 (14th Edition), 3/1984.

Primary Examiner—Harry N. Haroian
Attorney, Agent, or Firm—W. G. Fasse; D. H. Kane, Jr.

[57] ABSTRACT

A method and apparatus measure or gage worn railroad wheel profiles for the purposes of ascertaining the location of the new profile relative to the worn profile. The new profile is to be produced by a reprofiling operation such as a truing. For this purpose characteristic points on the worn profile are contacted in a radial and axial direction by a sensor and the respective displacement of the sensor is measured or gaged relative to a zero or null point. The location of the sensed points is then compared in a computer with a given reference location on a corrected profile. The corrected profile is then contacted with the sensed or gaged point which will make it possible to restore a correct profile with the least possible material removal in a milling or machining operation. In the apparatus for performing this method the sensor for the contacting or gaging of the worn points is preferably supported on a cross-slide enabling the sensor to perform a sensing movement in the axial direction and in the radial direction, preferably under a computerized numerical control.

11 Claims, 5 Drawing Sheets

METHOD AND APPARATUS FOR ASCERTAINING THE RADIAL LOCATION OF A NEW WHEEL PROFILE TO BE PRODUCED BY A REPROFILING OPERATION

FIELD OF THE INVENTION

The invention relates to a method for ascertaining the radial location of a new wheel profile to be produced by a reprofiling operation. The location of the new profile is to be determined with reference to an actually measured profile which does not correspond to the desired or rated profile of a railroad wheel that is stationary relative to a reference point. The axial position of the actually measured profile is known. The invention also relates to an apparatus for performing this method.

DESCRIPTION OF THE PRIOR ART

German Patent Publication No. 1,552,335, German Patent No. 2,537,086, and French Patent No. 1,295,442 describe methods and devices for measuring a wheel profile that is to be produced by a reprofiling operation on worn wheel profiles. These known systems work satisfactorily in a wide range. However, the conventional systems are not capable of determining the correct position of a wheel profile to be obtained by reprofiling if the wheel to be trued is very much worn, especially along its wheel rim and along its wheel flange, especially when the worn wheel flange extends almost perpendicularly to the wheel rim. Measurement errors in this context are not economical for several reasons. Errors either require a correcting truing cut on the wheel to be reprofiled, or the first reprofiling or truing cut removes an unnecessarily large quantity of material.

OBJECTS OF THE INVENTION

In view of the foregoing it is the aim of the invention to achieve the following objects singly or in combination:

to provide a method in which the actual profile of a worn wheel may be correctly ascertained and correctly correlated to the rated profile, either in a CNC-controlled machine, or with the aid of a respective separate control;

to make sure, based on the correctly measured or ascertained actual profile and its correlation to the rated profile, that the reprofiling or truing operation will involve the least possible material removal by the least possible number of cuts; and to provide an apparatus for performing the present method for controlling the machining operations in such a way that the least possible quantity of material is removed in the least possible number of cutting steps.

SUMMARY OF THE INVENTION

According to the invention the present method first establishes the mentioned reference point, whereupon at least one surface point on the wheel tread is ascertained in a measuring plane of each wheel. The radial spacing in the X-direction of this surface point is also ascertained relative to the reference point. Then, at least two points are determined on each wheel flange in different but given radial positions by axially sensing the wheel flange in the Z-direction. The radial and axial positions of these two additional points are then determined relative to a reference profile. Then the radial position of a rated profile is determined, whereby such rated profile must be tangent to at least one of the determined or ascertained points and so that simultaneously the other points are located on the rated profile or radially outside of the rated profile.

By sensing a surface point in the measuring plane and on the rim of the worn wheel a first position is marked, and it becomes possible to determine the location of this first position relative to a reference point. This fact and the further fact that the lateral position of the profile in the coordinate system is known, make it possible to orient the wheel in space for the respective computer and to thus enable the corresponding control. In this connection it is quite possible to define the sensed point in the measuring plane on the tread of the wheel as the reference point. Since the diameter of the wheel tread of a railroad wheel is also determined in the measuring plane, there is available a first information for the wheel diameter determination. With this information it is also possible to ascertain any radial imbalance. The wheel flange is then sensed by a lateral sensing in the axial or Z-direction in a location defined by a given radial spacing from the first ascertained point. The radial spacing between the first ascertained point and the point to be laterally sensed on the wheel flange can basically be freely selected, but the selection will depend on the particular degree of wear and tear of the profile to be trued. The spacing should be selected to be relatively small, for example 6 mm, to make sure that the resulting sensing point is located closely above the flange throat which merges into the worn tread surface of the wheel rim on the one hand and into the worn flange surface on the other hand. Thus, it becomes possible to ascertain a first information regarding the thickness of the worn wheel rim flange.

A sensing point located radially further outwardly on the wheel rim flange provides a third location of the actual profile, whereby the computer is already enabled to ascertain whether a rated wheel contour may be made to coincide with at least one of the three sensing points in such a way that the two other points are located radially outwardly of the rated profile. In other words, it can now be tested to see whether the two other points are located within the actual profile, more specifically within the material of the actual profile. However, when the sensing of the second point, that is, the first sensing of the wheel rim flange in a lateral, axial direction already shows that the axial spacing between this point and the measuring plane exceeds a certain limit value, it can already be determined, that any sensing points located radially further outwardly on the surface of the worn wheel rim flange will be of no significance for the new profile. Thus, in order to ascertain the exact position of the new profile, at least one further measuring point will be located according to the invention radially further inwardly rather than radially outwardly. In this manner it becomes possible to more precisely ascertain the transition area between the worn wheel rim flange and the worn tread surface. Hence, it will also be possible to more precisely position the new profile to be produced by a reprofiling operation also in the flange throat.

It is advantageous to sense at least two further surface points at different radial locations between the mentioned actual position of the point ascertained on the wheel rim flange, and the lateral or axial limit spacing. In this manner one can make the information regarding the worn contour more and more precise in the critical area so that the new contour to be produced by the reprofiling operation will be positioned more and more precisely.

Thus, with the method according to the invention it becomes possible to differentiate between different extents of wear and to respond to these differences with different measuring strategies so that at all times the points that are critical for the location of the new profile are recognized.

Another embodiment of the invention provides that an additional radial spacing of at least one surface point is ascertained in the lateral outer zone of the tread relative to the reference point. This additional point is sensed where the least wear and tear is to be expected. The radial spacing of this additional point to the corresponding points on the new profile to be produced is used as a basis for the decision regarding how many cuts must be made in a truing or reprofiling operation. This ascertaining of an additional radial spacing provides information regarding the total cutting or machining depth required for restoring the profile in the tread zone. This total chip cutting depth can be used as a basis for determining the required machine power and in determining a certain feed advance on the basis of which a suitable cutting division can be made. The cutting division which determines how many cuts are required for the complete truing operation, will make sure that the available machine power is used efficiently on the one hand, and that on the other hand the chip or cutting depth is suitable for the available tool. This determination also makes sure that a desired chip breaking and a normal wear and tear of the tool cutting edge is obtained.

The invention also suggests that the decision regarding a suitable cutting division takes into account a value ascertained by radially sensing the radial spacing between the actual wheel flange crest and the wheel flange crest of the rated profile. The so determined radial spacing value may make it necessary to determine another cutting division. Thus, especially in connection with wheels that have been subject to a substantial wheel flange wear and tear it is necessary to also take into account the just mentioned radial spacing when determining the cutting division. A computer can determine in this connection which measure is the critical measure for ascertaining a certain cutting division or member of required cuts.

According to the invention the radial reference point for the sensed or sensing point P1 is preferably located in the rotational axis of the wheel set shaft. By this feature it becomes very simple to simultaneously ascertain the old and new diameter of the sensed wheels by means of the above described sensing or gaging steps and the definition of a reference point in the rotational axis is also simple.

The apparatus according to the invention is characterized by the following features. Means are provided for fixing at least one wheel of a wheel set relative to a defined reference point. At least one gaging device is provided for sensing the surface of the wheel to be trued. The gaging device is supported and moved with the aid of a carrier slide. The carrier slide can move the gaging device at least radially and axially relative to the wheel, whereby the carrier slide is driven by drive means for the mentioned movement directions. The gaging device is further equipped with displacement measuring means for ascertaining the size of the travelled distance in the mentioned directions relative to the reference point. The distance or displacement measuring means are further connected with at least one computer for processing the data provided by the displacement or distance measuring means. The drive means on their part are connected to a computer responsive control for controlling the movements of the carrier slide. The gaging device is equipped with at least one sensor and with displacement measuring means for measuring the sensing or gaging movement in the sensing or gaging direction, whereby the displacement measuring means of the sensor are also connected to the computer. The means for fixing the position of a wheel or wheel set relative to a reference point may, for example, comprise the center points of a measuring apparatus or of a known truing machine. The defined reference point may be located on the center line interconnecting the center points of the machine.

However, the reference point may also be located at any suitable other point in space or it may be a suitable other point in the machine. The carrier slide which moves the gaging or sensing device in a radial and axial direction may be a cross-slide in which the slide is displaceable, for example, through a computer numerical controlled drive. Such CNC-controlled drives provide the first displacement information regarding the position of the gaging or sensor device. The CNC-control cooperates with the respective drive means and the displacement measuring means. A cooperating computer processes the data coming from the CNC-controlled drives and from the respective displacement measuring means. Simultaneously, a control device which is connected to the computer, supplies to the CNC-controlled drive means control pulses based on respective signals from the gaging device, for example for stopping the support slide.

A sensor forming part of the gaging device which is connected with displacement measuring means for ascertaining the gaging displacement of the sensor relative to the gaging device fixed to the cross-slide, may, for instance, be moved first in the Z-direction into a marked plane, for example the so-called measuring or sensing plane. For this purpose it is necessary that there is some information available regarding the Z-position of the wheel that needs to be sensed or gaged. This Z-position information may, for example, be obtained by means of a separate sensor performing a separate sensing or gaging operation. However, it is also possible to use the sensor of the invention for this purpose by moving the sensor according to the invention toward the tread or facing surface of the wheel, whereby the first information for the position of the wheel in the Z-direction is obtained. The spacing of the measuring or sensing plane from the gaged or sensed tread surface of the wheel is known and it is thus possible to move the gaging device into the respective lateral position with the aid of the respective displacement information and by means of the described control mechanism. Thereafter, the sensor may be displaced in the X-direction that is in the radial direction by means of the mentioned cross-slide until the sensor contacts the tread surface of the wheel to be gaged. In this manner a further information is obtained regarding the position of the wheel and the position of the sensed point in the measuring or sensing plane. Thereafter, the sensor may be withdrawn by a suitable displacement in the radial X-direction, for example, by 6 mm. In this position the sensor is then displaced in the Z-direction until the sensor contacts the flank of the wheel flange. With this point on the wheel flange and with the point in the measuring or sensing plane the computer is now in a position to displace a rated wheel profile that is stored in the computer memory, in such a manner that it takes up a position tangent to one or the other point while the respective other point remains located simultaneously outside this rated profile. Stated differently, this respective other point is located so to speak, within the material of the measured or actual profile. If this locating of the rated profile is accomplished, for example with the point on the wheel flange flank, it becomes necessary to sense a further point on the wheel flange flank radially further outwardly, and to check the position of that point. If the check shows that the point is located radially outwardly of the rated wheel profile, then the rated wheel profile is correctly positioned.

It is necessary to obtain correct displacement informations which are not falsified by the unavoidable stopping distance of the support slides and by the unavoidable sensing movements of the sensors, the sensing distance through which the sensor moves is also used as a displacement information which is measured by a displacement measuring device connected to the sensor. By these features the invention achieves a high precision in the ascertaining of the sensing displacement and thus a very precise displacement information.

According to one embodiment of the invention the sensor of the gaging device is constructed as a bell crank type lever having one leg extending in parallel to the radial plane of the wheel to be measured and another leg extending perpendicularly thereto. The bell crank lever is rotatable and displaceable in the radial plane of the wheel to be measured. The other leg of the bell crank lever carries at its free end a sensor, as well as means for converting at least a limited rotational movement of the second leg of the bell crank into a longitudinal movement which is at least approximately proportional to the rotational movement. The bell crank is further equipped with means for ascertaining the size of the longitudinal movement relative to a reference or zero point which is fixed relative to the gaging device. By these features it becomes possible to use but a single sensor while being able to perform a radial sensing in the X-direction as well as an axial sensing in the Z-direction. Nevertheless, such a sensor is also rather simple in its structure.

A further improvement of the bell crank type sensor lever comprises a third leg connected at right angles to the bell crank leg which is displaceable in parallel to a radial plane and which is rotatable. A converting unit senses the tilting or rotational movement of the third lever leg and converts it into a longitudinal movement in the X- or radial direction of a structural member moving in response to the converting unit and cooperating with a displacement sensor for determining the size of the longitudinal movement in the X- or radial direction. The just described components for converting the rotational movement into a longitudinal movement are simple in their structure and thus their function is reliable. In the light of the foregoing it is clear that a radial sensing involves a direct displacement of the sensor element in the X- or radial direction. On the other hand, an axial sensing in the Z-direction involves a rotational movement which is converted also into a linear movement in the radial direction. Thus, it is possible to use for both types of sensing one displacement measuring device which measures linear displacements in the X- or radial direction. It is also possible to reverse the described situation. In other words, it is possible to convert the radial sensing into a rotational movement and to cause a longitudinal displacement of the sensor element by the axial sensing.

The converting unit according to the invention comprises primarily a prism element or a hollow cone with a respective inner surface, a spherical element, and a connecting element, whereby the hollow cone is connected to the structural member which is longitudinally displaceable in such a way that a line perpendicularly to the base of the cone passes through the tip in the displacement or X-direction, whereby the spherical element contacts at least one point on the inner surface of the cone, while the connecting element connects the spherical element to the further or third leg of the bell crank. It has been found that the spherical element cooperating with the hollow cone or with the prism element provides a sufficiently precise proportionality in the range of the sensing displacements here involved, whereby simple means convert the rotational movement into the required linear movement.

Preferably, the axially displaceable and rotatable leg of the sensor is connected to an axial clutch for blocking the axial displacement against an axial force of an elastic element such as a spring which is effective on the rotatable leg of the sensor. This feature makes it possible to prevent an axial motion of the rotational axis of the sensing element when a sensing in the respective other direction takes place.

The axially displaceable structural member and the further leg or arm of the sensor should be coupled to each other by at least one elastic element in such a way that the spherical element is always urged to contact the inner surface of the prism element or of the hollow cone. The just mentioned elastic element must have a noticeably higher spring constant than the elastic element which is effective on the displaceable and rotatable leg of the sensor. During a sensing in the X-direction the spring with the smaller spring constant is loaded and the displacement movement of the sensor is transmitted through the spherical element and the hollow cone, for example, onto the axially guided and displaceable structural member which is connected to the displacement measuring means. Thus, the displacement measuring means measure the size of the displacement movement. The mentioned spring with the smaller spring constant opposes the displacement movement and presses the sensor element back into its starting position when the compression of the spring is relieved. The spring with the larger spring constant keeps the spherical element and the inner surface of the hollow cone in mutual contact. However, when the mentioned axial clutch is operated an axial movement of the respective element is no longer possible, rather, only the rotational movement is still possible. Thus, the ball element moves along a circular path about its respective rotational axis when a rotational movement occurs during an axial sensing operation. As a result, the spherical element travels along the inner cone surface outwardly, whereby an axial displacement of the hollow cone against the force of the stronger spring is enforced. As a result, the rotational movement caused by the sensing element is converted into a longitudinal movement which is at least approximately proportional to the rotational movement.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
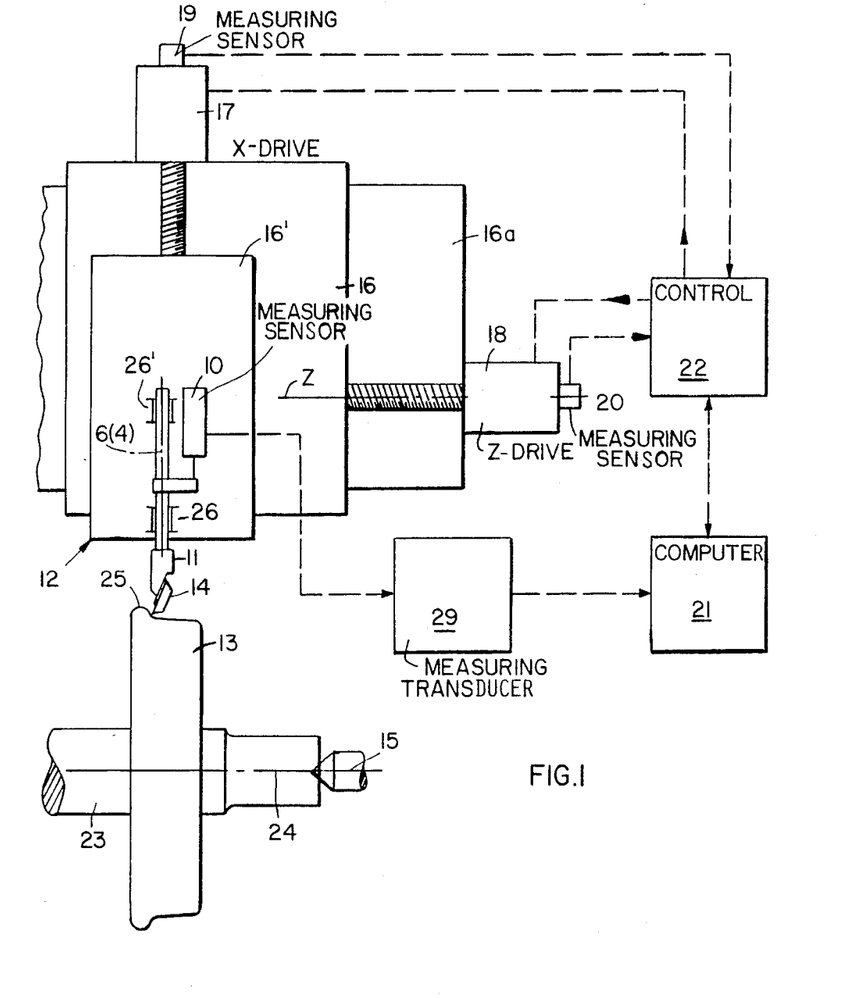
FIG. 1 is a schematic illustration of the system according to the invention.

Referring to FIG. 1 the wheel set, the wheels of which are to be measured, is mounted between two dead-center tips 15, for example of a truing machine. Only one wheel 13 and one dead-center tip 15 are shown for simplicity's sake. The other wheel and the respective dead-center tip are arranged mirror-symmetrically to the wheel and tip shown. The wheels are interconnected by an axle 23 having a rotational axis 24. For performing the measuring operation it is not critical in what way the wheel or wheel set is fixed and what means are used for mounting the wheel set. Using the dead-center tips of a truing machine is but one example for mounting the wheel set. However, since the location of the dead-center tip 15 is known, a defined reference point is easily obtained. This reference point may be located on the rotational axis 24 of the wheel set 23 passing through the dead-center tip 15.

The present apparatus comprises a carrier slide 16 located in a known position relative to the reference point. The carrier slide 16 carries a cross slide 16', whereby both slides 16 and 16' have their own respective drive 17 or 18 and each is equipped with its own displacement measuring means 19 or 20. The Z-drive 18 moves the carrier slide 16 in the Z-direction on a slide bed 16a. The drive 17 or the x-drive moves the cross slide 16' in the X-direction, please also see FIGS. 6 and 7.

The output signals of the displacement measuring means 19 and 20 of the drive means 17 and 18 respectively, and the output signals of a further displacement sensing means 10 are supplied to a computer 21 and to a control 22. To the extent necessary the signals from the measuring sensing means 10 are processed in the measuring transducer 29 so that the respective signals become suitable as input signals for the computer 21. The measuring transducer 29 may, for example, be a "Heidenhain VRZ 403". The computer also processes signals for the control 22 so that the control 22 controls the drive means 17 and 18 as required. These drive means and controls are conventional and permit moving the sensing device 12 into each desired position in the X-Z plane with a high precision and within the movement range of the particular drives.

Figure 2:
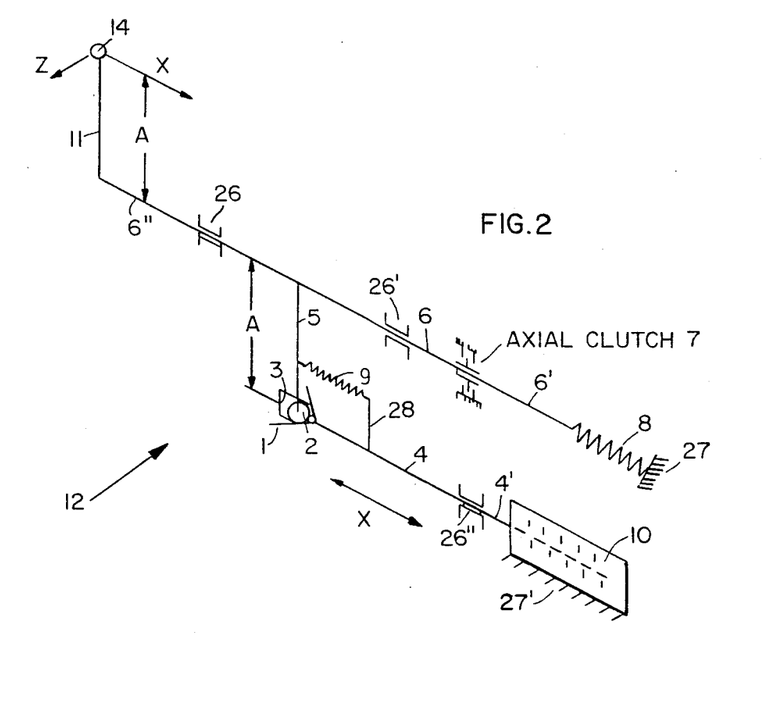
FIG. 2 illustrates schematically and in a perspective view the present sensor device.
Figure 3:
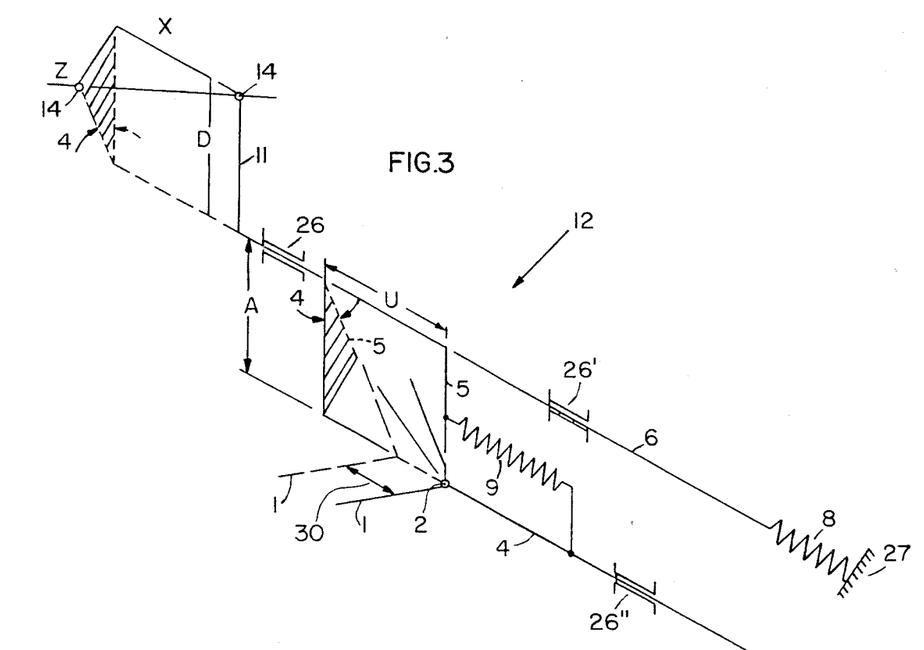
FIG. 3 illustrates the movement abilities of the sensor device according to FIG. 2.

FIGS. 2 and 3 schematically illustrate the structure of the sensing device 12. The schematic illustration is sufficient because it enables those skilled in the art to realize the structural details. Different structural means and different elements may be employed to realize the sensing or gaging device 12.

FIG. 2 shows the sensing device 12 in its resting or not sensing position, but ready to perform a sensing or scanning operation in the X-or Z-direction. The sensing device 12 comprises primarily a first lever arm 6 rotatably supported by bearings 26 and 26' which also permit the axial displacement of the first lever arm 6 in the X-direction which is defined by the longitudinal axis of the first lever arm 6. The bearings 26 and 26' are operatively secured to a housing of the apparatus not shown. An axially effective clutch 7, for example, a magnetic clutch, can prevent the axial displacement of the first lever arm 6 in the direction of the axis X. However, even if the clutch 7 is effective to prevent an axial displacement of the first lever arm 6, the latter is still able to rotate around its longitudinal axis. A right-hand end 6' of the first lever arm 6 is axially biassed by an elastic element 8, for example a helical spring, one end of which is secured against a fixed point 27 such as a machine frame member or the like, for example the cross-slide 16'. Securing one end of the biassing spring 8 to the cross-slide 16' is possible because the entire sensing device 12 and hence all its components, including a housing, remain stationary relative to the cross slide 16' at least during the sensing operation.

Figure 5:
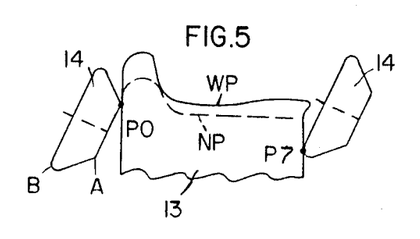
FIG. 5 illustrates lateral sensing points for ascertaining the lateral location and the width of the wheel rim.

The other end 6" of the first lever arm 6 carries a second arm 11 extending perpendicularly to the longitudinal axial direction of the first lever arm 6. The second arm 11 has the length "A". A sensor member 14 is secured to the free end of the second arm 11, for example, in the form of a frustum shaped sensor roller having a central axis forming the rotational axis of the sensor member 14. The frustum shaped sensor roller 14 is also shown in FIGS. 1 and 5. The sensing first lever arm 6 carries a third arm 5 as shown in FIG. 2 also extending perpendicularly to the longitudinal axis of the first lever arm 6 and in parallel to the second arm 11. The third arm 5 also has the length "A".

A structural member such as a shaft 4 supported in a bearing 26" is arranged in parallel to the first lever arm 6. The shaft 4 is also axially displaceable in its bearing 26" which is supported in a housing not shown. The left hand end of the shaft 4 is provided with a conical recess 1 arranged for cooperation with a spherical element 2 connected through a ball holder 3 to the third lever third arm 5. A further elastic element, such as a spring 9 connected to the third lever arm 5 and to the shaft 4 urges the spherical element into contact with the conical recess 1. Thus, any axial displacements of the first lever arm 6 are faithfully transmitted to the shaft 4 which is movable in the X-direction as indicated by the respective arrow. The further spring 9 makes sure that the spherical element 2 is always urged against the inner surface of the conical recess 1 when there is no external force effective on the sensing device 12.

The right-hand end 4' of the shaft 4 cooperates with the above mentioned further displacement sensing means 10 secured to a fixed point 27' which may be part of the housing of the sensing device 12 or it may be part of the cross slide 16'. The further displacement sensing means 10 measures the displacement of the shaft 4 in the X-direction. The further displacement sensing means 10 may comprise a magnetically operating sensor to convert the mechanical movement of the shaft 4 into respective electric signals which are transmitted through the measuring transducer 29 to the computer 21, see FIG. 1.

Figure 4:
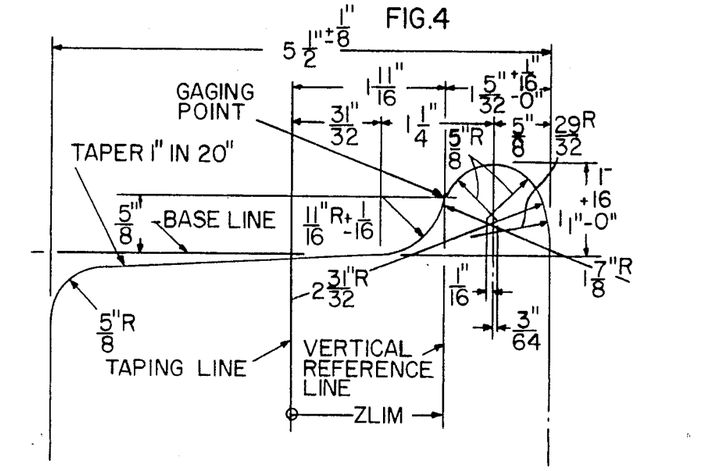
FIG. 4 is a typical railroad wheel profile with its dimensional values and illustrating a narrow flange tapered tread contour.
Figure 6:
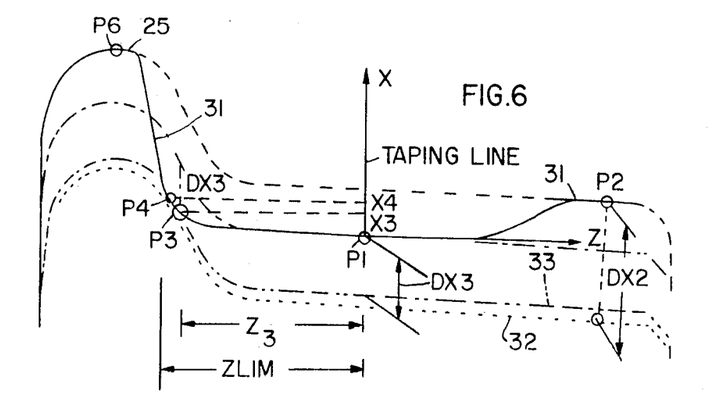
FIG. 6 illustrates one sensing procedure of the invention.
Figure 7:
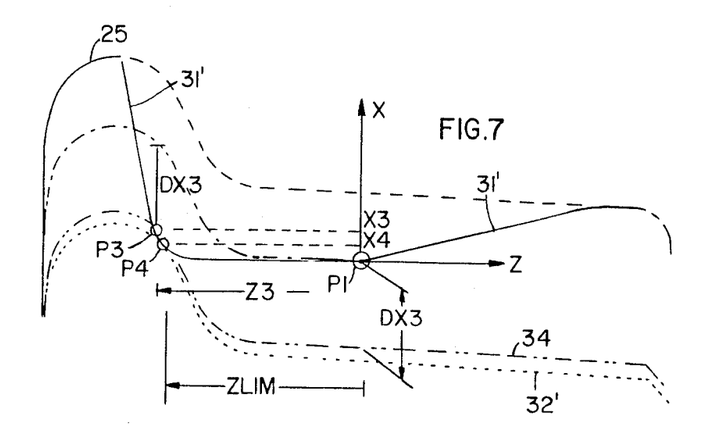
FIG. 7 illustrates another sensing procedure according to the invention.

The sensing device 12 shown in FIG. 2 can be moved by the drive means 17, 18 of FIG. 1 into a position in which its sensor member 14 is located in the measuring or sensing plane shown as the so-called taping line in FIG. 4. Thereafter, the drive 17 moves the sensing device 12 in the X-direction toward the tread surface of the wheel until the sensor member 14 contacts the point P1 on the tread surface of the wheel as shown in FIGS. 6 and 7. A further movement of the cross-slide 16' in the X- or radial-direction causes an axial displacement of the lever 6 against the force of the spring 8, whereby this axial displacement is transmitted through the third arm 5, through the spherical element 2 and through the hollow recess 1 to the shaft 4 and thus to the further displacement sensing means 10 which measures the size of this displacement in the X-direction or rather the extent of this displacement in the X-direction which may be preselected so that upon reaching a preselected limit value by the further displacement sensing means 10, the drive 17 is stopped through the control device 22. Upon such stopping the position of the cross slide 16' is sensed by the displacement measuring device 19 and the result is transmitted to the computer 21 and to the control device 22. Since a displacement information as measured by the further displacement sensing means 10 is present in the memory of the computer 21, the latter can determine the exact position of the point P1 as sensed by the sensor member 14. Further, the desired rated profile or contour of the wheel is also known and stored, for example, in the memory of the computer 21. Such a rated profile or contour is, for example, shown in FIG. 4 and is readily available from conventional sources, e.g. the "American Association of Railroads".

In order to sense the flank or throat of the flange, for example, in the point P3 according to FIG. 6, the sensing device 12 driven by the drive 18 is displaced in the Z-direction toward the flank of the flange at a respective radial distance from the point P1. When the sensor member 14 contacts the flank of the flange, the further advance of the carrier slide 16 in the Z-direction provides a deflection or excursion of the sensor member 14 and this excursion or deflection is converted by the second arm 11 into a rotational movement of the first sensor lever arm 6. In order to avoid a simultaneous axial displacement of the first sensor lever arm 6, the axial clutch 7 is activated which in this state permits a rotational movement of the first lever arm 6, but prevents any axial movement. Since the third sensor arm 5 is rigidly connected to the first lever arm 6 it will rotate with the first lever arm 6 so that the ball element 2 will rotate along a circular path about the longitudinal axis of the first lever arm 6 just as the sensor member 14. As a result, the ball element 2 bears on one surface of the cooperating member, for example the hollow cone 1, thereby forcing the hollow cone 1 to yield in the X-direction, whereby an axial movement of the shaft 4 is caused against the force of the spring 9. Thus, the rotational movement of the sensor member 14 is converted into a longitudinal movement of the shaft 4, whereby this resultant longitudinal movement is at least approximately proportional to the deflection of the sensor member 14. Since the displacements resulting from such sensing are small, the obtainable proportionality between the rotational and axial movements is sufficiently precise or accurate for the present purposes.

The size of the axial movement of the shaft 4 is measured by the displacement sensing means 10 and the result is supplied to the computer 21, if desired, through a measuring transducer 29. The displacements of the sensor member 14 and of the ball element 2 are represented by hatched surfaces which also show the displacement represented by an angle phi as seen in FIG. 3. As an example, the angular displacement represented by the angle phi has caused an axial displacement of the shaft 4 by a length represented by the double arrow 30 in FIG. 3. Incidentally the spring 9 has a noticeably larger spring constant than the spring constant of the elastic element 8 for clearly distinguishing the axial displacement of the shaft 4 from any axial displacement of the first lever arm 6 of the sensing device 12. Further, the reference profile of the wheel does not need to correspond or coincide with the rated profile. In principle, the reference profile can be selected at random. However, it is necessary that any deviations between the reference profile and the rated or desired profile are known at least for each sensing or gaged point.

The operation of the present system will now be described with reference to FIGS. 6 and 7. First basic considerations will be described. The sensing device 12 comprises the above mentioned sensor member 14 constructed as a frustum shaped conical roller having a measuring edge A and a measuring edge B, see FIG. 5. The conical sensor roller 14 is movable between the sensing points P0 and P7, as shown in FIG. 5. The dashed line contour in FIG. 2 represents the new profile NP and the full line represents the worn profile WP. The conversion of a rotational movement of the conical sensor roller 14 into an axial displacement has been described above. The further displacement sensing means 10 may comprise a digital transducer of the type "Heidenhain Model MT 60". The above mentioned clutch 7 prevents movement of the sensor roller 14 in the X-direction when measurement in the Z-direction is intended. For this purpose the clutch 7 is switchable as mentioned above.

The sensing device 12 is mounted on a cross-slide 16, 16' which is movable in the X-direction and in the Z-direction by means of the drives 17 and 18 as described above. A measuring operation is performed by first moving the cross-slide 16, 16' with the aid of the control unit 22 to a location behind the object to be measured, that is, behind the point to be first gaged. As soon as the sensor roller 14 contacts the point to be sensed and has been displaced by a predetermined quantity, the result is transmitted to the control unit 22 through the measuring further displacement sensing means 10, the measuring transducer 29, and the computer 21 as shown in FIG. 1. The measuring transducer 29 may, for example, be of the type VRZ 403 made by Heidenhain in West Germany. The computer 21 may, for example, be of the type S5 which is a personal computer made by Siemens in West Germany. The control unit 22 may be of the type 850 T, also made by Siemens. The control unit 22 and the computer 21 may actually be a single unit. In response to the signal received from the measuring transducer 29, the computer stops the cross-slide through the control unit 22. An interface, for example of the type V 24 may be provided between the computer 21 and the measuring transducer 29. The interface of the type V 24 is also manufactured by Siemens of West Germany. Before the cross-slide 16, 16' comes to a full stop, it passes through a brake distance. The position of the object to be measured can be determined from the position of the sensor roller 14 and from the location of the cross-slide 16, 16' when it stops. The computer 21 ascertains the position of the cross-slide 16, 16' with the aid of the measuring sensors 19, 20 of the cross slide 16, 16'. The measuring sensors 19 and 20 may, for example, be of the type ROD 426 which generates impulses in response to the displacement of the respective cross-slides and the pulses are counted as a measure of the displacement. Model ROD 426 is also manufactured by Siemens of West Germany and includes so-called measuring circuit cards. The computer 21 then processes the measured values for determining the location of the sensed or gaged point.

Where the wheel set rotates it is necessary to determine the unbalance and to also know the balanced rotation of the wheel set. The measuring transducer 29 uses memories for storing the minimum and maximum values of the measured values. After the cross-slides 16, 16' have stopped, the computer 21 uses the stored values for determining the unbalanced and balanced rotation. These values may be stored for one full rotation or for a given angular movement. One full revolution or any angular part thereof is measured by the sensors 19 and 20.

The measuring of an actual wheel profile, for example, as shown in FIG. 4 will now be described. First the sensing device 12 determines, or rather senses the axial position of at least one wheel 13 in space. For this purpose a sensing in the Z-direction is made. An impact sensing is made to ascertain the most important characteristic value or parameter, namely the location of the highest point of the wheel set.

The next measurement is made to ascertain the wear and tear of the wheel diameter in the measuring point P1 located in the measuring or sensing plane. For this purpose the sensor roller 14 is displaced in the X-direction after the sensing device 12 has been displaced in such a way that the sensing point of the sensor roller 14 is located in the measuring or sensing plane or taping line. The position of the measuring circular plane is known if the position of the wheel 13 in space is known. Next, an impact measuring can be made in the X-direction in the same manner as has been done heretofore in the Z-direction. Thereafter, the cross-slide 16, 16' and the sensing device 12 are displaced by a small distance, for example 5 mm in the X-direction followed by a displacement in the axial Z-direction with the largest possible speed to drive toward a programmed point, the Z-coordinate of which may, for example, be 70 mm. During this operation the sensing device 12 or rather its sensor roller 14 contacts the worn wheel profile 31 in point P3. The slide 16 is stopped and the position of the measuring point P3 determined by its coordinates X3, Z3 relative to the X-Z-coordinate system, is ascertained. The origin of the X-Z-coordinate system is located in the measuring point P1. The point P3 is displaced from a rated profile 33 by a distance DX3. The rated profile 33 shown by a double-dashed, double-dotted line in FIG. 6 is stored with its coordinates in the computer 21 for example, in the form of a value table or in the form of a mathematical interpolation function. The zero point P1 of the rated profile 33 is also the measuring point P1. The distance between the zero point P1 and the rated profile 33 is shown at DX3 in FIG. 6 and also in FIG. 7. This distance DX3 is that distance by which a new profile 32 must be displaced in the radial or X-direction if the new profile 32 is to be machined or milled when starting from the worn profile 31 shown by a full line in FIG. 6.

The computer 21 tests whether Z3 is located above or below of a limit value Zlim which separates the concave portion from the convex portion of the profile, please see FIG. 4. If the profile is worn very much, the point Z3 is located further away from the origin or zero point than Zlim so that for the location of the new profile a point having a smaller X-coordinate value than X3 is of importance. Due to this check the computer causes a measurement of the point P4 in the same manner as has been done in the point P3, whereby the respective coordinate 3 is larger than the coordinate X4 and X4 is larger than zero, for example X4=0.5 X3; X3>X4>0.

If the profile is less worn, namely Z absolute smaller Zlim, the computer will locate the measuring point P4 at a certain distance $\Delta X$, for example 4 mm above the measuring point X3 and then cause the measuring of the point P4. Z4 and DX4 not shown in the drawing are the result of this measurement and these points are taken into account in the next following spacing calculation. The computer compares the values DX3 and DX4, whereby the larger value now determines the position of the new profile to be obtained by a truing operation. If the difference between DX3 and DX4 is larger than a given value and if DX4 is larger than DX3, a point P5 not shown is measured in the same manner and such point provides the distance value DX5. Generally, three measuring points are sufficient for the truing in the zone of the flange flank. In the vicinity of the general measuring point Pi which yielded the maximum value of the displacement DXi, the new profile 32, 32' to be obtained by a truing operation will lie tangent to the worn profile 31, 31'. By a parallel displacement of the new profile 32, 32' in the X-direction, it becomes possible for the computer 21 to control the production of a so-called "witness groove" in this point Pi, please refer to the manual of the "American Association of Railroads", Rule 1F2. If the differences between DX3 and DX4 are very small, this witness groove occurs as a non-machined location as shown in FIGS. 6 and 7 approximately between the points P3 and P4 if the rated profile takes up the position 33 in FIG. 6 or FIG. 34 in FIG. 7.

The measuring points P2 and P6 on the outer surface of the profile 31, 31' and on the ridge of the flange are measured for determining the cutting depth of the truing operation. For this purpose a given Z-position is sensed in the X-direction. With the aid of these values, the computer 21 determines the procedure for the subsequent material removing truing operation on the profile, for example by determining the number of cuts to be made in the truing operation for an optimal material removal which removes neither too much nor too little material.

The determination of the wheel rim width and thus, for example, of the radius that must be produced at the front face of the rim, a further measuring point P7 may be measured on the wheel rim front face as shown in FIG. 5, in accordance with the above mentioned AAR Manual. The measurement takes place in an analog manner as in point 2.

The procedure according to the invention permits ascertaining the location of the new profile 32, 32' to be produced by a truing operation with a high precision and with a short measuring time. The effort and expense for performing the present procedure, for example, on a wheel truing machine under a computer numerical control, is minimized in that the CNC-control and the respective slides and drives of the machine can also be used for the present purposes by mounting the sensing device 12 on the respective slides.

Although the invention has been described with reference to specific example embodiments, it will be appreciated that it is intended to cover all modifications and equivalents within the scope of the appended claims.

What we claim is:

1. A method for ascertaining the radial position of a new profile to be produced by a reprofiling operation with reference to an actual, worn profile not corresponding to a rated profile of a railroad wheel having a fixed location relative to a reference point and of which the axial position of the actual profile is known, comprising the following steps:
    (a) ascertaining in a sensing or measuring plane of each wheel (13) at least one surface point (P1) on the wheel tread,
    (b) ascertaining the radial distance in the X-direction of said surface point (P1) to said reference point,
    (c) ascertaining in different, but given radial locations at least two points (P3, P4) at each rim flank by an axial gaging in the Z-direction,
    (d) ascertaining the radial and axial location of said at least two points (P3, P4) relative to a reference profile, and
    (e) ascertaining the radial location of a rated profile (32, 32') which rated profile forms a tangent with at least one of the ascertained points, whereby simultaneously at least the other sensed points of the actual profile are located on the rated profile or radially outside the rated profile.

2. The method of claim 1, further comprising ascertaining whether the actual position of at least one point (P3) of a first sensing operation at the rim flank is located at a lateral distance from said circular measuring plane which exceeds a lateral limit distance (Zlim) (FIG. 7), and, if that condition is present, sensing at least the second point (P4) in a radial location positioned radially further inwardly.

3. The method of claim 2, further comprising sensing at least two further surface points in different radial locations between the actual position of point (P3) and said lateral limit distance (Zlim).

4. The method of claim 1, further comprising ascertaining an additional radial spacing (DX2) of at least one surface point (P2) at least in a lateral outer zone of the tread surface (31, 31'), in which the least wear and tear is to be expected, relative to said reference point and using said additional radial spacing (DX2) of said at least one surface point (P2) to the respective point on the new profile (32) to be produced, for making a determination whether the reprofiling operation should be divided into several cutting steps each producing a cut chip of given thickness.

5. The method of claim 4, further comprising radially sensing a point (P6) on the flange of the wheel rim to be reprofiled and ascertaining the radial spacing of the so measured actual wheel rim flange from the wheel rim flange of said rated profile, and using these values in making the decision regarding a suitable division of the reprofiling process into said several cutting steps.

6. The method of claim 1, further comprising locating the reference point in the radial direction in the point of contact (P1) or in the rotational axis (24) of a wheel set shaft (23).

7. An apparatus for ascertaining data required for reprofiling a worn railroad wheel, comprising means (15) for fixing at least one wheel (13) of a wheel set relative to a defined reference point, at least one sensing device (12) including sensing means for gaging the surface of the wheel to be reprofiled or trued, carrier means for supporting said sensing device, drive means (17, 18) connected to said carrier means for moving said sensing device at least in a radial direction and in an axial direction relative to the wheel to be trued by respectively moving said carrier means, displacement measuring means (19, 20) arranged for ascertaining the size of the displacement in the mentioned radial and axial directions relative to said reference point, computer means (21) operatively connected to said displacement measuring means (19, 20) for processing data provided by the displacement measuring means, drive control means operatively connected to said drive means (17, 18) and to said computer (21) for controlling the movement of said drive means, said sensing means of said sensing device (12) comprising at least one sensor (6, 11, 14) and further displacement sensing means (10) connected to said at least one sensor (6, 11, 14) for ascertaining the size of the sensing movement in a sensing direction, and means (29) connecting said further displacement sensing means (10) to said computer (21) for providing further data to said computer (21) for providing truing information to be used in a subsequent truing operation, and wherein said at least one sensor (6, 11, 14) comprises a bell-crank type contact lever having a first lever arm (6) which is displaceable and rotatable in parallel to a radial plane of the wheel to be trued and a second arm (11) arranged perpendicularly to said first lever arm (6), said second arm (11) carrying a sensor member (14) at its free end, and means for converting at least a limited rotational movement of said first lever arm (6) into a longitudinal movement which is at least approximately proportional to said limited rotational movement, said further displacement sensing means (10) being arranged for ascertaining the size of said longitudinal movement relative to said reference point which is in a fixed position relative to said sensing device (12).

8. The apparatus of claim 7, wherein said first lever arm (6) of said contact lever comprises a third arm (5) attached to said first lever arm at a right angle, and wherein said converting means (1,2,3) are arranged for converting an angular movement of said third arm (5) into a longitudinal movement for displacing a longitudinally guided structural member (4) cooperating with said further displacement sensing means (10) for determining the size of said longitudinal movement in the X-direction.

9. The apparatus of claim 8, wherein said movement converting means (1, 2, 3) comprise a prism element or a hollow cone (1) with a respective inner surface, a ball element (2) and a connecting element (3), whereby the prism element or the hollow cone (1) is connected to the longitudinally displaceable structural member (4) in such a way that a line perpendicularly to a base through a tip (15) extends in the displacement X-direction, and whereby the ball element (2) contacts at least one point on said inner surface of said hollow cone, said ball element being connected with the connecting element (3) to said third arm (5).

10. The apparatus of claim 9, wherein said displaceable and rotatable first lever arm (6) of said contact lever comprises an axially effective clutch (7) for locking the displacement movement and an elastic element (8) for applying an axial force to said displaceable and rotatable first lever arm (6) of said contact lever.

11. The apparatus of claim 10, wherein said third arm (5) and said longitudinally guided structural member (4) are coupled to each other by means of at least one further elastical element (9) in such a way that said ball element (2) is always maintained in contact with the inner surface of the prism element or the hollow cone (1), whereby said further elastic element (9) has a noticeably higher spring constant than a spring constant of the first mentioned elastic element (8), which is effective on said first lever arm (6).

* * * * *